Figure 1:
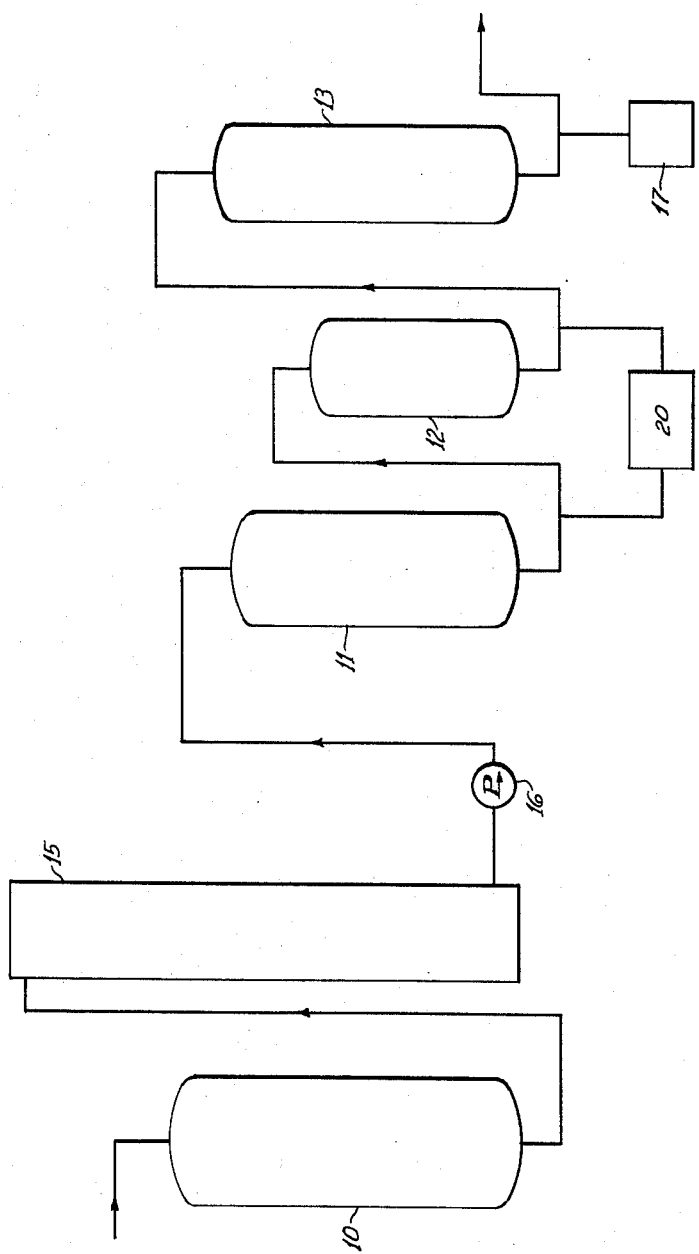

May 31, 1960

H. G. CARLSON ET AL 2,938,868

METHOD OF CONTROLLING REGENERATION
OF ION EXCHANGERS AND APPARATUS

Filed March 11, 1955

2 Sheets-Sheet 1

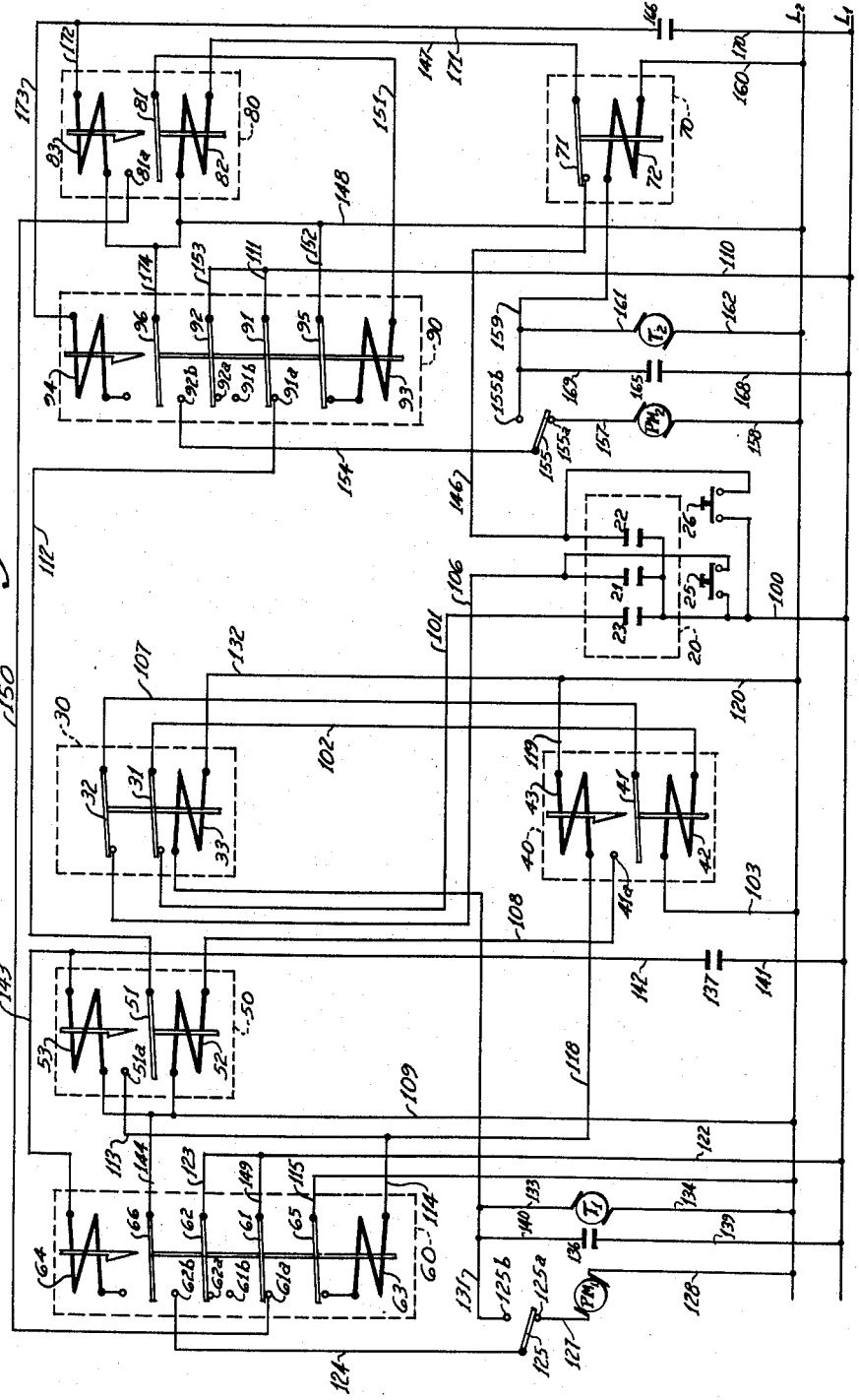

United States Patent Office 2,938,868
Patented May 31, 1960

2,938,868

METHOD OF CONTROLLING REGENERATION OF ION EXCHANGERS AND APPARATUS

Herbert G. Carlson, Chicago, Ill., and Hilding B. Gustafson, Tucson, Ariz., assignors to Infilco Incorporated, Pima, Ariz., a corporation of Delaware Filed Mar. 11, 1955, Ser. No. 493,632

14 Claims. (Cl. 210—25)

This invention relates to means and methods of controlling the regeneration of the exchange beds of an ion exchange plant, and more particularly of a plant of this type including multiple cation and anion exchange beds.

The invention is particularly useful for the automatic control of ion exchange operation in cases where the solution supply to the exchangers is of variable nature. Since ion exchange units have a definite exchange capacity per regeneration it follows that as dissolved solids in the solution increase, the capacity of the exchanger units in gallons per regeneration decreases and, vice versa, as dissolved solids decrease, the gallon capacity of the exchanger units per regeneration increases. In such instances, therefore, the usual method of basing the control of exchanger regeneration on the passage of a predetermined quantity of solution through the exchanger is unsatisfactory, as the exchanger may be exhausted before the predetermined quantity of solution has passed, when the mineral contents of the solution are high, and, conversely, when the mineral contents of the solution are low, the exchange capacity of the exchanger may not be fully utilized when the predetermined quantity of solution has passed through the exchanger. The invention prevents a deterioration of the effluent at times of high mineral content and permits chemical economy to be maintained at times of low mineral content, while still allowing fully automatic operation of the plant.

It has previously been proposed to use a quality of the exchanger effluent, and particularly an electrically determinable characteristic such as pH, conductivity, or resistance for automatic instigation of the regeneration of ion exchangers treating solutions of variable nature.

The present invention relates to the control of ion exchange operation from an electrically determinable characteristic of the exchanger effluent, such control being effected in a novel and improved manner.

It is an object of this invention to provide improved control means and methods for initiating the regeneration in an ion exchange plant including multiple alternate cation and anion exchange units operating in series.

Another object is to provide improved means and methods for automatic control of an ion exchange plant of this general type.

Another object is to provide an automatically controlled ion exchange plant capable of maintaining a predetermined effluent quality and chemical economy despite a solution supply of varying nature.

Another object is to provide a process of, and control means for, simultaneously initiating the regeneration of a first and a second cation exchanger from a change in an electrically determinable characteristic of the second cation exchange effluent.

Another object of the invention is to provide in combination with cation exchangers whose regeneration is initiated in this manner means effective after completion of a regeneration cycle to block an immediate repeated regeneration as, due to the poor quality of the effluent at the beginning of a run, the electrically determinable characteristic of the effluent passes through the predetermined value at which regeneration normally is initiated.

Another object is to provide control means for automatically initiating the regeneration of a first and a second anion exchanger from a change in an electrically determinable characteristic of the first anion exchanger effluent.

Another object is to provide an automatically regenerated ion exchange plant including alternate multiple serially arranged cation and anion exchangers with means whereby the regeneration of the anion exchangers cannot start during regeneration of the cation exchangers, and vice versa.

Other objects will become apparent upon consideration of the detailed description and the claims which follow.

The invention is particularly suited for ion exchange plants with four exchanger beds operating in sequence and including a first and a second anion exchange unit following, respectively, a first and a second cation exchange unit, and will, therefore, be described in connection with such a plant. However, certain features of the invention also apply where the plant comprises only one cation exchanger, followed by, or interposed between, two anion exchangers, or consists of two anion exchangers.

The invention will be more readily understood by reference to the drawings wherein Figure 1 is a diagrammatic view of a plant according to the invention; and Figure 2 is an electrical wiring diagram for the plant of Figure 1, showing how the regeneration of the exchangers of Figure 1 can be initiated automatically or manually in accordance with the invention.

The plant shown in Figure 1 comprises a first cation exchange unit 10, a first anion exchange unit 11, a second cation exchange unit 12, and a second anion exchange unit 13, connected for flow through the units in the sequence mentioned. Each of said units includes a bed of suitable exchange material, not shown. The two cation exchange beds may be composed of any one of the many cation exchange materials capable of operating in the hydrogen cycle, such as, for example, a high capacity styrene resin. While the two anion exchanger beds may be composed of the same anion exchange resin, which can be either weakly or strongly basic, it is usually preferable for best efficiency and economy of the plant to use a weak base resin for the first bed and a strong base resin for the second bed. Any one of the numerous known weak and strong base anion exchange resins, such as, for example, those described in Patents Nos. 2,597,493 and 2,597,494, respectively, may be used.

It is usual but not essential to include a degasifier, ordinarily a forced draft aerator, in a plant of this type for removing the carbon dioxide from the cation exchanger effluent. The degasifier 15 may be interposed between the first cation exchanger 10 and the first anion exchanger 11, as shown in Figure 1. If the first anion exchanger is strongly basic, this position of the degasifier is necessary to reduce the load on the first (highly basic) anion exchanger by removal of carbon dioxide at this point. When a weak base resin is used in the first anion exchanger, the degasifier may precede or follow the first anion exchanger 11. When a degasifier is provided, then the solution is pumped by a pump 16 to the primary anion exchanger 11.

The plant is preferably provided with means for automatically carrying out the regeneration cycle for the exchanger beds. These means form no part of the invention and are not shown in Figure 1. Those parts which are directly controlled by the regeneration initiating means are shown in Figure 2 and will be described in connection with this figure. To provide a continuous check on the quality of the plant effluent, a conductivity meter 17 may be provided.

Means 20 are provided for measuring an electrically determinable characteristic of the effluent of the first anion exchanger 11 and of the effluent of the second cation exchanger 12 and may take the form of a pH measuring instrument connected to the effluent conduits of anion exchanger 11 and of cation exchanger 12. In this case the regeneration of the exchangers will be initiated on the basis of pH. Alternatively, the measuring instrument 20 may be a conductivity meter or an ohm meter, in which case regeneration of the exchangers will be initiated on the basis of conductivity or resistance, respectively. Usually, recording means are connected with the measuring instrument.

During operation the calcium, magnesium and the greatest part of the sodium contained in the solution are removed by the first cation exchanger 10. Most of the free carbon dioxide in the effluent from the first cation exchange unit is released in the forced draft aerator 15. The first anion exchanger 11 removes the sulfates and chlorides, except for sulfates and chlorides associated with sodium leaking through the first cation exchanger 10. The load on the secondary units, therefore, is light, and these units provide a highly efficient safety factor, and result in chemical economy not possible in a two bed plant, because the provision of the secondary exchangers permits more leakage through the primary exchangers than permissible in a two bed plant. The second cation exchanger 12 removes the sodium which has leaked through the first cation exchanger 10, and the second anion exchanger 13 removes any silica contained in the solution, the carbon dioxide remaining after treatment in the degasifier 15 and mineral acidity developed in the second cation exchanger 12. As the first cation exchanger 10 approaches exhaustion, more sodium will leak through than during the main part of the run, and the load on the secondary exchangers will increase.

When the capacity of the exchangers becomes exhausted, regeneration becomes necessary. As is usual in the art, the cation exchangers may be regenerated with acid and the anion exchangers with caustic. As will be explained below in detail, the regeneration of the cation exchangers is initiated when the pH, or the conductivity, or the resistance of the secondary cation exchanger effluent reaches a predetermined value, and the regeneration of the anion exchange units is initiated when the pH, or the conductivity, or the resistance of the effluent of the first anion exchanger reaches a predetermined value. While the two cation exchangers can be regenerated in parallel, preferably all the acid for the regeneration of both cation exchangers is first used for regeneration of the secondary cation exchange unit and then for regeneration of the primary cation exchange unit. Similarly, while the two anion exchange units can be regenerated in parallel, it is preferred that all the caustic needed for the regeneration of both units is first passed through the secondary anion exchanger and then through the primary anion exchanger. This countercurrent regeneration is very economical, as the secondary units are highly overregenerated without using more regenerant than would be needed for regenerating the primary units alone. Means are also provided preventing the initiation of the regeneration of the anion exchangers during the regeneration of the cation exchangers, and, vice versa, initiation of the regeneration of the cation exchange units before the regeneration of the anion exchangers is completed.

The four unit ion exchange plant shown in Figure 1 is capable of fully automatic operation, including automatic initiation of the regeneration cycles without deterioration of the treated water quality when treating a raw water supply having wide variations in its mineral content, and is particularly useful in the treatment of such water supplies.

By initiating the regeneration of both of the cation exchange units due to a change in an electrically determinable characteristic, such as conductivity, resistance or pH, of the effluent of the secondary cation exchange unit rather than the effluent of the primary cation exchange unit, an exacting control of the cation exchange units is attained, preventing subsequent poor quality water from the plant. This will become clear from consideration of the following: Assuming for purposes of illustration that the permissible leakage is 2 p.p.m. (parts per million): When treating a supply with a very low content of chlorides and sulfates, say, for example, 15 p.p.m., a mineral acidity of the primary cation exchanger effluent of from 15 to 13 p.p.m. is acceptable, corresponding to from about 130 to about 110 micromhos; but when the mineral acidity drops below 13 p.p.m., the leak exceeds the permissible value. The change from a maximum of 130 micromhos to a minimum of 110 micromhos is distinct and measurable on conductivity meters. Therefore, if the chloride and sulfate content of the supply is constant and low, regeneration could be controlled from the primary cation exchanger effluent. However, this picture changes completely when the chloride and sulfate contents of a solution are high. Taking, for example, a sulfate and chloride content of 300 p.p.m. with a corresponding conductivity of roughly 2500 micromhos, then the range between maximum and permissible minimum would be between 2500 and 2480 micromhos, which is hardly measurable on a normal conductivity meter. The same is true of the equivalent changes in resistance and pH, the latter being even less measurable due to lower sensitivity of the pH measuring instruments. Thus, with a high content of chloride and sulfate in the supply, control from the primary cation exchanger effluent is unreliable.

When the solution is of variable nature, then initation of the regeneration of the two cation exchangers from the primary cation exchanger effluent becomes entirely impossible. For when the chloride and sulfate content varies, it cannot be ascertained whether a drop in the conductivity of the primary cation exchanger effluent, or equivalent change in resistance or pH, is due to a change in the mineral contents of the supply or to leakage of the exchanger.

On the other hand, the secondary cation exchanger effluent affords a reliable and convenient means for initiation of the regeneration of both cation exchangers under all conditions. This will be apparent when considering that the conductivity, resistance and pH of the secondary cation exchanger effluent only reflect the leakage through the primary cation exchanger. Therefore, these characteristics will always have a relatively small value, so that upon a breakthrough of the primary cation exchanger, there will be a distinct and readily measurable change in this value, whether the raw solution has a high or a low content of chlorides and sulfates.

After the completion of the regeneration of the cation exchange units and return of the plant to exchange operation, the pH, or equivalent characteristic, of the effluent of the secondary cation exchanger may immediately, or almost immediately, attain the predetermined value at which the regeneration of the cation exchangers is initiated. This may be caused by incomplete rinsing of the acid regenerant from the cation exchange beds, by the poor quality water that has been in the degasifier and the primary anion exchanger since the end of the previous run, or by reason of the well-known fact that due to sodium leakage the first cation exchanger effluent at the beginning of a run is below average quality.

Therefore, in automatic operation according to the invention, after a regeneration of the cation exchangers has been completed, a further regeneration of the cation exchange units is blocked until the electrically determinable characteristic of the secondary cation exchanger effluent has attained a second predetermined value between the first predetermined value and the normal operating value of said characteristic.

According to the invention, the regeneration of both of the anion exchange units is initiated when an electrically determinable characteristic, such as pH, of the effluent of the primary anion exchange unit reaches a predetermined value. The electrically determinable characteristic of the primary anion exchange unit is used because the primary anion exchange unit absorbs most of the anion load, and, consequently, as it approaches exhaustion, it must be regenerated in order to maintain a high quality final plant effluent. Also, in the event of failure of the primary anion exchange bed, an immediate regeneration of the bed is necessary. By regenerating both anion exchanges when the primary anion exchanger requires regeneration, the secondary anion exchange unit has a potential capacity in excess of that required, which in turn supplies a safety factor that allows the primary cation exchanger to be run until it breaks through without loss in quality of the final effluent of the plant.

An example of means that may be used according to the invention to control the initiation of the regeneration of both the cation and the anion exchange units and to automatically block an immediate second regeneration of the cation exchangers is shown in Figure 2. Also included are automatic means for automatically preventing the initiation of the regeneration of the anion exchangers during regeneration of the cation exchangers and vice versa.

Assume that the anion exchange units have been previously regenerated and that the regeneration of the cation exchange units has just been completed. All of the electrical equipment will then be in the position shown in Figure 2, and the cation and anion exchange units are returned to service. For purposes of exemplification assume further that the measuring instrument 20 is a pH meter. The measuring instrument 20 has a pair of normally open contacts 21 which close automatically when the pH of the secondary cation exchanger effluent reaches a predetermined value, and a pair of normally open contacts 22 which close automatically when the pH of the primary anion exchanger effluent reaches a predetermined value. Inasmuch as the regeneration of the cation exchange units was initiated by a predetermined value of the pH of the effluent of the secondary cation exchange unit, there remains in the degasifier and the first anion exchange unit water which, in passing through the secondary cation exchanger, again may cause the pH to reach the predetermined value which would start another regeneration of the cation exchangers. In order to prevent such an immediate second regeneration of the cation exchange units, the measuring instrument 20 has a third pair of normally open contacts, designated by the numeral 23, which must close before a circuit can be completed through contacts 21 and which close only when a predetermined value of pH is reached that is between the predetermined value at which contacts 21 close and the normal operating value. Thus, initiation of the regeneration of the cation exchangers is blocked as long as contacts 23 are open.

Instead of initiating the regeneration of the exchangers automatically, by means of contacts 21 and 22, the regeneration cycles of the cation and anion exchangers, respectively, may be started manually by pressing the pushbuttons of switches 25 and 26, respectively. Pushbutton switches 25 and 26 may be part of the measuring instrument 20, or may be separate therefrom, as shown for purposes of illustration in Figure 2.

To effect the initiation of the regeneration of the cation exchangers the electrical diagram of Figure 2 includes a double pole single throw normally closed relay 30 having poles 31 and 32 and coil 33, a single pole normally open latch-in relay 40 having a pole 41, coil 42 and latch coil 43, a second single pole normally open latch-in relay 50 including pole 51, coil 52 and latch coil 53, and a double pole double throw latch-in relay 60 including poles 61 and 62, coil 63, latch coil 64, and coil protection poles 65 and 66. The purpose of the relay 30, when energized, is to make the contact pairs 21 and 23 of pH instrument 20 inoperable after initiation of the regeneration of the cation exchangers and keep them inoperable until its completion. The purpose of relay 40 is to prevent the initiation of an immediate second regeneration of the cation exchangers until coil 42 is energized due to the closing of contacts 23 of pH instrument 20. The purpose of relay 50 is to complete, when energized, a circuit to delatch relay 40 and also to complete a circuit through the coil of relay 60. The purpose of relay 60 is to start, when energized, the regeneration of the cation exchangers by completing a circuit through a microswitch which initiates the wash operation and through a timer which, when actuated, controls the further steps of the regeneration cycle and returns the cation exchangers to operating position in conventional manner. The relay 60 has the further function of blocking the competion of the circuit that initiates regeneration of the anion exchangers during regeneration of the cation exchangers.

To effect the initiation of the regeneration of the anion exchangers, the electrical diagram shown in Figure 2 includes a single pole normally closed relay 70 having a pole 71 and coil 72, a single pole normally open latch-in relay 80 having a pole 81, coil 82 and latch coil 83, and a double pole double throw latch-in relay 90, including poles 91 and 92, coil 93, latch coil 94 and coil protection poles 95 and 96. The purpose of relay 70 is to make the pair of contacts 22 inoperable after initiation of the regeneration of the anion exchangers and keep them inoperable until its completion. The purpose of relay 80 is to complete a circuit through the coil of relay 90. The relay 90 serves the same purposes for the anion exchangers as the relay 60 does for the cation exchangers.

When the effluent of the second cation exchange unit passes through the predetermined pH value, at which contacts 23 close automatically, a circuit is established from source of electric power $L_1$, through conductor 100, contacts 23, conductor 101, pole 31 of relay 30, conductor 102, coil 42 of relay 40, and conductor 103 to $L_2$. This circuit energizes coil 42, closing pole 41 of relay 40, which is then mechanically latched in and remains in closed position, where it contacts contact 41a, until coil 43 is energized. Thereafter, when the pH of the effluent of the second cation exchange unit drops to the predetermined value, at which contacts 21 of pH instrument 20 close automatically, a circuit is established from $L_1$ through conductor 100, contacts 21, conductor 106, pole 32 of relay 30, conductor 107, pole 41 and contact 41a of relay 40, conductor 108, coil 52 of relay 50, and conductor 109 to $L_2$. Instead of using the automatically operating contacts 21 of pH instrument 20 to establish the circuit, pushbutton switch 25 may be closed manually when the pH attains the predetermined value, which may be ascertained from an indicator or recorder associated with pH instrument 20.

Closing of this circuit energizes coil 52 of relay 50 and closes pole 51, which is then mechanically latched in and remains in closed position, where it contacts contact 51a until coil 53 is energized. When pole 51 of relay 50 closes, a circuit is established from $L_1$ through conductors 110 and 111, pole 91 and contact 91a of relay 90, conductor 112, pole 51 and contact 51a of relay 50, conductors 113 and 114, coil 63 and coil protection pole 65 of relay 60, and conductor 115 to $L_2$. This energizes coil 63 of relay 60, whereupon relay 60 is mechanically latched in and remains in closed position until its coil 64 is energized. Closing of pole 51 of relay 50 also completes a circuit from $L_1$ through conductors 110 and 111, pole 91, contact 91a, conductor 112, pole 51, contact 51a, conductors 113 and 118, coil 43 of relay 40, and conductors 119 and 120 to $L_2$. This energizes coil 43 and delatches relay 40, which in turn breaks the circuit through coil 52 of relay 50 at pole 41, whereby coil 52 is deenergized.

When relay 60 is latched in, coil 63 is deenergized due to opening of pole 65. Also, when relay 60 is latched in, the pole 62 moves from the position where it is in contact with contact 62a to the position where it contacts contact 62b, completing a circuit from $L_1$ through conductors 122 and 123, pole 62 and contact 62b of relay 60, conductor 124, a micro switch 125, contact 125a, conductor 127, position motor $PM_1$ of the second cation exchange unit, and conductor 128 to $L_2$. This starts the position motor $PM_1$, which moves the micro switch 125 from the position where it contacts contact 125a to its "Wash" position where it contacts contact 125b. When micro switch 125 is in the "Wash" position, the wash step of the regeneration cycle is started. Also, when micro switch 125 is in the "Wash" position, the circuit through motor $PM_1$ is broken and circuits are completed from $L_1$ through conductors 122 and 123, pole 62 and contact 62b of relay 60, conductor 124, micro switch 125, contact 125b, conductor 131, and from there through coil 33 of relay 30, and conductors 132 and 120 to $L_2$, and also through conductor 133, timer $T_1$, and conductor 134 to $L_2$. Closing of the circuit through coil 33 energizes the coil, thereby opening relay 30 and breaking the circuits through contacts 21 or pushbutton switch 25 and through contacts 23 of pH instrument 20 at poles 32 and 31, respectively. Relay 30 remains open until the cation exchangers have completed regeneration.

The timer $T_1$ has contacts 136 and 137, which are shown for clarity's sake separate from the timer but are actually a part of the timer. Closing of the circuit through the timer $T_1$ starts the timer, which then controls the remainder of the regeneration cycle of the cation exchange units in usual manner. A predetermined time after its starting, the timer will start the position motor $PM_1$ by conventional means, not shown, to return the micro switch 125 to its initial position which ends the wash step of the regeneration cycle. As the micro switch 125 returns to this position, the timer closes its contacts 136. Thus, at the same time that the circuits through the timer $T_1$ and through coil 33 of relay 30 are broken at contact 125b of the micro switch 125, they are closed through conductor 139, contacts 136 and conductor 140.

At the end of the regeneration cycle of the cation exchangers the timer $T_1$ returns the cation exchangers in conventional manner to operating position. Simultaneously, the timer closes its contacts 137, which completes a circuit from $L_1$ through conductor 141, contacts 137, conductor 142, coil 53 of relay 50, and conductor 109 to $L_2$, and also a circuit from $L_1$ through conductor 141, contacts 137, conductors 142 and 143, coil 64 and pole 66 of relay 60, and conductors 144 and 109 to $L_2$. These circuits energize coils 53 and 64 and de-latch relays 50 and 60, respectively. Finally, the timer $T_1$ opens contacts 136 and 137. When contacts 136 are open, coil 33 of relay 30 is deenergized and timer $T_1$ stops. Opening of the contacts 137 deenergizes coils 53 and 64. All of the relays and contacts are now back in the position shown in Figure 2.

When the pH of the effluent of the first anion exchange unit reaches a predetermined value, contacts 22 of pH instrument 20 close automatically, establishing a circuit from $L_1$ through conductor 100, contacts 22, conductor 146, pole 71 of relay 70, conductor 147, coil 82 of relay 80, and conductor 148 to $L_2$. Instead of using the automatically acting contacts 22 of pH instrument 20 to establish the circuit, pushbutton switch 26 may be closed manually when the pH attains the predetermined value, which may be ascertained from an indicator or recorder associated with pH instrument 20. Closing of this circuit energizes coil 82, which closes pole 81, which is then mechanically latched in and remains in closed position where it contacts contact 81a until coil 83 is energized. Closing of pole 81 of relay 80 establishes a circuit from $L_1$ through conductors 122 and 149, pole 61 and contact 61a of relay 60, conductor 150, contact 81a and pole 81 of relay 80, conductor 151, coil 93 and pole 95 of relay 90, and conductors 152 and 148 to $L_2$. This energizes coil 93 of relay 90, whereupon relay 90 is mechanically latched in and remains in closed position until its coil 94 is energized.

When relay 90 is latched in, coil 93 is deenergized due to opening of pole 95. Also, when relay 90 is latched in, the pole 92 moves from the position where it is in contact with contact 92a to the position where it contacts contact 92b, completing a circuit from $L_1$ through conductors 110 and 153, pole 92 and contact 92b of relay 90, conductor 154, micro switch 155, contact 155a, conductor 157, position motor $PM_2$ of the first anion exchange unit, and conductor 158 to $L_2$. Closing of this circuit starts the position motor $PM_2$, which moves micro switch 155 from the position where it contacts contact 155a to its "Wash" position, where it contacts contact 155b. This starts the wash step of the regeneration cycle.

When micro switch 155 is in its "Wash" position, circuits are completed from $L_1$ through conductors 110 and 153, pole 92 and contact 92b of relay 90, conductor 154, micro switch 155, contact 155b, conductor 159, and from there through coil 72 of relay 70, and conductor 160 to $L_2$, and also through conductor 161, timer $T_2$, and conductor 162 to $L_2$. Closing of the circuit through coil 72 energizes the coil, thereby opening relay 70 and breaking the circuit through contacts 22 of pH instrument 20 or pushbutton switch 26 at pole 71. Relay 70 remains energized until the anion exchangers have completed regeneration.

The timer $T_2$ has contacts 165 and 166, which are shown for clarity's sake separate from the timer but are actually part of the timer. Closing of the circuit through the timer $T_2$ starts the timer, which then controls the remainder of the regeneration cycle of the anion exchange units in usual manner. A predetermined time after its starting the timer $T_2$ will start the position motor $PM_2$ to return the micro switch 155 to its initial position, thus ending the wash step of the regeneration cycle. As the micro switch 155 returns to this position timer contacts 165 close. Thus, the circuits through the timer $T_2$ and through coil 72 of relay 70, which were broken at contact 155b, are closed through conductor 168, contacts 165, and conductor 169.

At the end of the regeneration cycle of the anion exchangers the timer $T_2$ returns the anion exchangers in conventional manner to operation. Simultaneously, the timer closes its contacts 166, which completes a circuit from $L_1$ through conductor 170, contacts 166, conductors 171 and 172, coil 83 of relay 80, and conductor 148 to $L_2$, and also a circuit from $L_1$ through conductor 170, contacts 166, conductors 171 and 173, coil 94 and pole 96 of relay 90, and conductors 174 and 148 to $L_2$. These circuits energize coils 83 and 94 and de-latch relays 80 and 90, respectively. Finally, the timer $T_2$ opens contacts 165 and 166. When contacts 165 are open, coil 72 of relay 70 is deenergized and the timer stops. Opening of contacts 166 deenergizes coils 83 and 94. All of the relays and contacts are now back in the position shown in Figure 2.

The blocking of the regeneration of the anion exchangers during regeneration of the cation exchangers is effected as follows: When relay 60 is latched in and pole 61 moves from the position where it is in contact with contact 61a to the position where it contacts contact 61b, completion of the circuit which energizes coil 93 of relay 90 is prevented, thus locking out the anion exchange units and preventing their regeneration until the relay 60 is de-latched after completion of the regeneration of the cation exchangers.

Similarly, the blocking of the regeneration of the cation exchangers during regeneration of the anion exchangers is effected as follows: When relay 90 is latched in and pole 91 moves from the position where it is in contact with contact 91a to the position where it contacts contact 91b, completion of the circuit which energizes coil 63 of relay 60 is prevented, thus locking out the cation exchange units and preventing their regeneration until the relay 90 is delatched after completion of the regeneration of the anion exchangers.

A plant according to the invention has been installed recently to treat a raw water supply whose mineral characteristics are quite variable. The extent of the variations in the characteristics of the raw water over a period of years and the typical characteristics of the raw water are shown in Table I. The quality of the treated water specified is also shown in this table.

*Table I*

[All values p.p.m. as $CaCO_3$]

|  | Raw Water | | Treated Water |
| --- | --- | --- | --- |
|  | Range | Typical |  |
| Calcium | 85–220 | 83 | 0.05 |
| Magnesium | 16–74 | 52 |  |
| Sodium | 86–286 | 138 | 0.45 |
| Total Cations | 187–580 | 273 | 0.5 |
| Alkalinity | 55–197 | 111 | 0.4 |
| Sulfate | 63–90 | 67 |  |
| Chloride | 69–293 | 95 | 0.1 |
| Total Anions (not inc. $SiO_2$) | 187–580 | 273 | 0.5 |
| Silica | 9–21 | 14 | 0.04 |
| Mineral Acidity | 132–383 | 162 |  |
| Maximum Conductivity in micromhos |  |  | 7 |

The plant includes in sequence a primary cation exchange bed of 31 cubic feet of high capacity styrene resin, a degasifier, a primary anion exchange bed of 22 cubic feet of weak base resin, a secondary cation exchange bed including 16 cubic feet of high capacity styrene resin, and a secondary anion exchange bed including 18 cubic feet of strong base resin. The plant is furnished with a pH measuring and recording instrument as described, which is connected to the effluents of the secondary cation exchanger and of the primary anion exchanger. One of the two pairs of contacts associated with the secondary cation exchanger closes when the pH is 3.0, and the other when the pH is 3.5. The pair of contacts associated with the primary anion exchanger closes when the pH is 4.5.

The length of run between regenerations of the cation exchangers has varied due to the variable mineral characteristics of the raw water. In terms of gallons treated typical runs have treated 53,600 gallons, 43,000 gallons, 42,700 gallons and 44,000 gallons. Similarly, for the anion exchangers typical runs have treated 42,300 gallons, 34,560 gallons, 34,400 gallons and 31,500 gallons.

A high quality of water in sufficient quantities has been produced at all times. At the end of a run the conductivity of the plant effluent rarely gets above 5 microohms. During most of the run the conductivity is about 1.5 micromhos. Silica checks have shown readings of less than 0.01 p.p.m. for the greatest part of the run with a slight increase at the beginning and the end of the run.

Many modifications of the invention shown and described herein can be made without departing from the spirit and scope of the invention. Thus, obviously instead of using a common measuring instrument for the secondary cation exchanger and the primary anion exchanger, separate instruments can be used. In automatic operation these separate instruments would be connected in the wiring diagram of Figure 2, and the instrument for the secondary cation exchanger would be provided with two sets of control contacts, such as 21 and 23, and the instrument for the primary anion exchanger would be provided with one set of control contacts, such as 22. When using separate measuring instruments, the initiation of the regeneration of the anion exchangers and that of the cation exchangers can be based on different electrically determinable characteristics.

It will also be obvious that the plant need not be operated automatically, but can be operated by hand, provided the necessary personnel is available.

Accordingly, it will be understood that we do not wish to limit ourselves to the exact details of the embodiment of the invention, shown for purposes of exemplification but not of limitation.

We claim:

1. A method of controlling the regeneration of an ion exchange plant of the type including a first cation exchange unit operating in the hydrogen cycle, a first anion exchange unit, a second cation exchange unit operating in the hydrogen cycle, and a second anion exchange unit, connected in series in the above sequence, comprising the steps of passing the solution to be treated through said plant, measuring an electrically determinable characteristic of the effluent of said second cation exchange unit, measuring an electrically determinable characteristic of the effluent of said first anion exchange unit, initiating the regeneration of both said cation exchange units when said electrically determinable characteristic of said second cation exchange unit effluent attains a predetermined value and initiating the regeneration of both said anion exchange units when said electrically determinable characteristic of said first anion exchange unit effluent attains a predetermined value.

2. The method of claim 1, in which at least one of said electrically determinable characteristics is pH.

3. The method of claim 1, in which at least one of said electrically determinable characteristics is conductivity.

4. The method of claim 1, in which at least one of said electrically determinable characteristics is resistance.

5. In the operation of an ion exchange plant of the type including a first hydrogen cation exchange unit, a first anion exchange unit, a second hydrogen cation exchange unit, and a second anion exchange unit, connected in series in the sequence cited, a method of controlling the initiation of the regeneration of said cation exchangers comprising the steps of measuring an electrically determinable characteristic of the effluent of said second cation exchange unit, initiating the regeneration cycle of both said cation exchange units when said electrically determinable characteristic attains a first predetermined value, and after completion of the regeneration cycle blocking a repeated initiation of the regeneration of said cation exchange units due to said electrically determinable characteristic attaining said first predetermined value, until said electrically determinable characteristic has attained a second predetermined value intermediate said first predetermined value and the normal operating value.

6. In the operation of an ion exchange plant including a primary and a secondary anion exchange unit, a method of controlling the initiation of the regeneration of said units, comprising measuring an electrically determinable characteristic of the effluent of said primary anion exchange unit during exchange operation of said plant, and initiating the regeneration of both said anion exchange units when said electrically determinable characteristic attains a predetermined value.

7. In an ion exchange plant of the type including a primary hydrogen cation exchanger, a primary anion exchanger, a secondary hydrogen cation exchanger, and a secondary anion exchanger through which solution to be treated flows in the sequence cited, and means for automatically controlling initiation of the regeneration cycles of said exchangers, the improvement in said automatic control means comprising means responsive to a predetermined extreme value of an electrically determinable characteristic of the effluent of the secondary cation exchanger, means, including a first electric circuit, operative to initiate regeneration of both said cation exchangers upon closing of said circuit, said responsive means effecting closing of said first electric circuit when said electrically determinable characteristic of the effluent of said secondary cation exchanger reaches said predetermined extreme value, second means responsive to a predetermined extreme value of an electrically determinable characteristic of the effluent of the primary anion exchanger, and means, including a second electric circuit, operative to initiate regeneration of both said anion exchangers upon closing of said second circuit, said second responsive means effecting closing of said second circuit when said electrically determinable characteristic of the effluent of said primary anion exchanger reaches said predetermined extreme value.

8. The apparatus of claim 7, in which at least one of said responsive means is a pH meter.

9. The apparatus of claim 7, in which at least one of said responsive means is a conductivity meter.

10. The apparatus of claim 7, in which at least one of said responsive means is an ohm meter.

11. Apparatus for controlling initiation of the regeneration cycles of the cation exchangers of an ion exchange plant including a primary hydrogen cation exchanger, a primary anion exchanger, a secondary hydrogen cation exchanger, and a secondary anion exchanger through which solution to be treated flows in the sequence cited, said apparatus comprising means responsive to a predetermined value of an electrically determinable characteristic of the effluent of said secondary cation exchanger, means, including an electric circuit, operative to initiate regeneration of both said cation exchangers upon closing of said circuit, said responsive means effecting closing of said circuit when said electrically determinable characteristic of the effluent of said secondary cation exchanger reaches its predetermined value, and relay means connected in said electric circuit blocking the closing of said circuit after the completion of the regeneration of said cation exchangers until said electrically determinable characteristic has attained a second predetermined value intermediate said first predetermined value and the normal operating value.

12. Apparatus for automatically initiating the regeneration cycle of the anion exchange units of an ion exchange plant including a primary and a secondary anion exchange unit, comprising means responsive to a predetermined value of an electrically determinable characteristic of the effluent of said primary anion exchange unit, and means, including an electric circuit, operative to initiate regeneration of both said anion exchange units upon closing of said circuit, said responsive means effecting closing of said circuit when said electrically determinable characteristic attains said predetermined value.

13. Apparatus for controlling the initiation of the regeneration of the cation exchangers of an ion exchange plant of the type including a primary hydrogen cation exchanger, a primary anion exchanger, a secondary hydrogen cation exchanger, and a secondary anion exchanger through which solution to be treated flows in the sequence cited, said apparatus comprising a measuring instrument including a first pair of normally open contacts adapted to close when an electrically determinable characteristic of the effluent of the secondary cation exchanger reaches a first predetermined value, a second pair of normally open contacts adapted to close when said electrically determinable characteristic reaches a second predetermined value intermediate said first predetermined value and the normal operating value, a circuit through each of said pairs of contacts, a relay having a coil energizable by closing of the circuit through said second pair of contacts, and having a normally open pole closing when said coil is energized, said pole being connected in the circuit through said first pair of contacts, relay means having a coil energizable by closing of the circuit through said first pair of contacts when said pole is closed, a position motor, a circuit through said position motor, said relay means having a pole closing said circuit through said position motor when the coil of said relay means is energized, closing of the pole of said relay means simultaneously opening the pole of said relay, a micro switch in the circuit through said position motor and having a first position wherein said circuit is closed and a second position wherein said circuit is broken and regeneration of said cation exchangers is initiated, said position motor, upon closing of said last mentioned circuit by said pole of said relay means, moving said micro switch to its second position, a timer adapted to control the remainder of the regeneration cycle of said cation exchangers, a circuit through said timer and the pole of said relay means, the circuit through said timer being closed when said micro switch is in said second position, said timer, at the end of the wash period of said cation exchangers, starting said position motor to return said micro switch to its first position, and after completion of the regeneration of said cation exchangers opening the pole of said relay means.

14. The apparatus of claim 13, including a third pair of normally open contacts for said measuring instrument adapted to close when the electrically determinable characteristic of the effluent of said primary anion exchanger reaches a predetermined value, a circuit through said third pair of contacts, second relay means having a coil energizable by the closing of the circuit through said third pair of contacts, a second position motor, a circuit through said second position motor, said second relay means having a pole closing said circuit through said second position motor when the coil of said second relay means is energized, a second micro switch in said circuit through said second position motor having a first position wherein said circuit is closed and a second position wherein said circuit is broken and regeneration of both said anion exchangers is initiated, said second position motor, upon closing of said circuit through the second position motor by the pole of said second relay means, moving said second microswitch to its second position, a second timer adapted to control the remainder of the regeneration cycle of said anion exchangers, a circuit through said second timer and the pole of said second relay means, the circuit through said second timer being closed when said second microswitch is in said second position, said second timer, at the end of the wash period of said anion exchangers, starting said second position motor to return said second micro switch to its first position, and after the completion of the regeneration of said anion exchangers opening the pole of said second relay means.

References Cited in the file of this patent

UNITED STATES PATENTS

| 2,051,155 | Staegeman | Aug. 18, 1936 |
| 2,176,471 | Pyle et al. | Oct. 17, 1939 |
| 2,404,367 | Durant et al. | July 23, 1946 |
| 2,422,054 | Tiger | June 10, 1947 |
| 2,586,169 | Kline | Aug. 4, 1947 |
| 2,617,766 | Emmett et al. | Nov. 11, 1952 |
| 2,628,191 | Sard | Feb. 10, 1953 |

FOREIGN PATENTS

| 569,660 | Great Britain | June 4, 1945 |